United States Patent [19]
Nichilo

[11] Patent Number: 5,939,106
[45] Date of Patent: Aug. 17, 1999

[54] SINGLE-STATION THERMOFORMING APPARATUS

[76] Inventor: Giorgio De Nichilo, Via Aldo Moro, 49, 20066, Melzo, Italy

[21] Appl. No.: 08/864,833

[22] Filed: May 29, 1997

[30] Foreign Application Priority Data

Jun. 19, 1996 [IT] Italy .................................. MI96A1244

[51] Int. Cl.⁶ .................................................. B29C 51/42
[52] U.S. Cl. .......................... 425/384; 264/322; 425/407
[58] Field of Search ...................................... 425/384, 388, 425/407; 264/322

[56] References Cited

U.S. PATENT DOCUMENTS

3,386,503  6/1968  Corning et al. ........................ 425/384
3,466,706  9/1969  Asano ..................................... 425/384
3,597,799  8/1971  Earle ...................................... 425/384

*Primary Examiner*—Harold Pyon
*Assistant Examiner*—Joseph Leyson
*Attorney, Agent, or Firm*—Bucknam and Archer

[57] ABSTRACT

A single-station thermoforming apparatus is provided with at least an oven including a heating panel, formed by two panel portions which can be driven on a plane parallel to the laying plane of a plastics material sheet to be thermoformed and which can be mutually coupled at a common coupling line, thereby providing an even distribution of heat through the overall surface of the plastics material sheet being processed, and preventing any thermal differentials among different regions of the material sheet being processed.

13 Claims, 7 Drawing Sheets

SINGLE-STATION THERMOFORMING APPARATUS

BACKGROUND OF THE INVENTION

The present invention relates to a novel single-station thermoforming apparatus and the method carried out by this apparatus.

The thermoforming machines falling within the scope of the invention are those machines in which a sheet-like plastics material (in general a plate or a coil bobbin) is at first heated to the plasticizing temperature thereof and then is formed or shaped by means of a suitable mold and counter-mold system.

In prior art single-station thermoforming apparatus, the heating ovens usually comprise monolithic construction panels, which are conventionally arranged both above and under the plastics material to be processed, and being provided with suitable heating means (electric resistances) arranged on the surface of each oven and oriented towards the plastics material.

The plastics material, in particular, is loaded into the heating station and is arranged herein in a horizontal position. During this loading operation, the heating ovens are withdrawn and arranged outside of the heating region, on the rear of the apparatus or on the same side thereof. Then, with the electric resistances being in a turned-on condition, the heating panels are driven towards the sheet-like plastics material. In particular, for a two-oven station arrangement, the heating ovens are designed to be "sandwich" arranged on the plastics material, thereby covering the overall surface thereof. Thus, the heating ovens are conventionally introduced into the heating station receiving at a fixed position thereof the plastics material to be processed with a parallel relationship to the sheet being processed and starting from an edge of said sheet facing the heating panels (i.e. the rear of the apparatus or the single oven access side).

This movement is continued to cause the plastics material sheet to be fully covered by the surfaces of the ovens. The thus achieved position is successively held for the time necessary to achieve a desired plasticizing temperature, and, after having achieved said plasticizing temperature, the heating ovens are driven for withdrawal in an opposite direction. With the heating panels fully disengaged or moved away from the sheet-like plastics materials, the forming step proper is started, which is usually preceded by an air blowing-in step for providing the so-called pre-stretching "ball", in order to pre-stretch the sheet plastics material. The forming operation, in particular, is performed by causing the mold or molds to approach the plastics material sheet, with a simultaneous formation of vacuum or application of pressurized air, in order to cause the plastics material to satisfactorily adhere to the mold. Upon having performed the forming operation, the molds are opened, the formed product is withdrawn from the forming station and is replaced by a new plastics material sheet to be thermoformed.

Great drawbacks are related to the above discussed thermoforming machines or apparatus, mainly with respect to the disclosed movements of the heating panel or panels. In fact, as discussed, a full covering of the plastics material sheet by the heating ovens is achieved starting from a same side (usually from the rear of the apparatus), which includes the inlet and outlet sections of the panels with respect to the heating station. This means that the plastics material portion arranged at this side is that which will receive the greatest amount of heat, whereas the opposite side (i.e. that arranged at the front of the apparatus) will be cooler than the other side.

In the above discussed prior art, great efforts have been made to overcome any thermal differentials, in particular by differently balancing the oven electric resistances. This balancing operation which, anyhow, is very complex, has not been however found as satisfactory to solve the above mentioned problem. In fact, in heating processes in which small thickness plastics material sheets are heated, even very small thermal differentials between opposite sides of the sheet material are susceptible to cause uncontrollable phenomena, such as the so-called "blistering" effect (a burning of the plastics material on the oven inlet side and a not sufficient heating on the opposite side).

As stated, the surface of the heating panel or panels included in the heating ovens must be at least equal to that of the plastics material sheet to be processed. Thus, it should be apparent that the construction of the mentioned panels will occupy a comparatively high volume and that the masses to be driven are comparatively large. Because of this reason, whereas the main surface of the heating panels corresponds to a large displacement thereof in order to cover and then disengage the surface of the plastics material, the weight of said panels will hinder and slow down the disclosed oven movements.

On the other hand, a high speed withdrawal of the panels from the heating station is indispensable in order to prevent burning or flaming, due to an accidental contact against the vary hot resistances of the bottom oven, of the material being heated. Such a risk, on the other hand, frequently occurs in monolithic construction oven thermoforming apparatus. In fact, in these prior stations, the highest heat concentration occurs at the central regions of the heating panels and, accordingly, at the central portions of the plastics material sheet covered by the heating ovens. This central portion, accordingly, will be subjected to the greatest deformation (usually a buckling deformation); and this in a region of the sheet plastics material which, since it is arranged at the greatest distance of the edges engaged in the heating station, will be most susceptible to deformation under the effect of its weight.

An inevitable consequence is that, even for small over-heatings in this central region of the plastics material sheet (which, anyhow, are rather frequent considering the discussed requirement of balancing the smaller heating occurring on portions of the sheet) may cause the material sheet to fall on the underlaying panel or oven, with a consequent burning thereof.

In order to overcome the above mentioned drawbacks, the sole solution afforded by prior thermoforming apparatus was that of quickly withdrawing the panels outside the region covered by the plastics material sheet. This operation, as stated, is however hindered by the large surfaces of the ovens and by inertial forces related to the large masses being driven. Accordingly, all of the prior thermoforming apparatus including single heating stations are subjected to frequent burning or flaming risks.

In addition to the above mentioned drawbacks, heating stations of prior art thermoforming apparatus are moreover affected by yet other drawbacks mainly related to the wiring assemblies of the heating electric resistances and the overall size of the thermoforming apparatus.

The first of these drawbacks derives from the fact that the large surface which must be covered by the electric resistances, coinciding with the surface of the oven facing the plastics material, requires to use very large length cables, and related protective assemblies for protection against heat. The second drawback, on the other hand, is directly related to the construction of prior thermoforming apparatus, usually including a "front" portion, i.e. that side of the machine through which the plastics material is loaded into the heating station, and a "rear" portion, i.e. that side of the machine where the heating panel or panels is/are held at a withdrawn or rest position. Thus, this single access operating position constitutes a typical limitation of these prior apparatus which hinders a quick and accurate installation of the apparatus in a manufacturing system.

SUMMARY OF THE INVENTION

Accordingly, the aim of the present invention is to provide such a single-station thermoforming apparatus in which the heat can be evenly distributed through the overall surface of the plastics material to be processed, i.e. without any thermal differentials between different regions of said plastic material.

Within the scope of the above mentioned aim, a further object of the present invention is to provide such a thermoforming apparatus which comprises quickly displaceable heating ovens, specifically designed for quickly moving away from the regions of the apparatus which would be easily susceptible to burning or flaming phenomena.

Yet another object of the present invention is to provide such a thermoforming apparatus in which the heating ovens, while being adapted to process comparatively large surfaces of plastics material sheets, have a comparatively reduced size and in which the masses to be displaced are such as to allow a quick withdrawal of said sheets.

Yet another object of the present invention is to provide a thermoforming apparatus including heating ovens the power supply cables of which can be arranged in a comparatively simple manner.

Yet another object of the present invention is to provide such a single station thermoforming apparatus allowing an operator to access the apparatus from two sides thereof.

According to one aspect of the present invention the above mentioned aim and objects are achieved by a single-station thermoforming apparatus comprising at least an oven movable through a plane parallel to a laying plane of a plastics material sheet to be thermoformed and at least a mold, said apparatus being essentially characterized in that said at least an oven comprises a heating panel including two panel portions which can be displaced through said plane parallel to said plastics material sheet and which can be coupled to one another at a common coupling line.

The present invention also relates to a heating method performed by the thermoforming apparatus according to the above mentioned claims, which heating method is essentially characterized in that it provides to start the heating process simultaneously at opposite sides of said plastics material sheets.

Thus, the two-portion construction of the oven, preferably the two half-panel construction, will allow to cover the overall surface of the plastics material sheet, without causing any thermal differentials which are, on the contrary, typical of prior thermoforming apparatus. Actually, the apparatus according to the invention will allow to drive the oven starting from the two opposite sides of the plastics material sheet instead of a single side of prior apparatus. Thus, contrarily to prior thermoforming apparatus, the thermoforming apparatus according to the present invention provides the advantage of starting the thermal or heating process from the opposite sides of the plastics material sheet and, accordingly, without any temperature differentials therebetween.

A further great advantage of the invention is that the region of the panel providing the greatest heat amount (usually the central region of the panel or oven) has been divided into two portions, each of which corresponds to the central portion of the related panel parts. Thus, the oven will be better thermally balanced, thereby distributing its operating heat through the overall surface of the sheet material to be processed, without concentrating heat on single portions of the sheet material.

This improved heat distribution is moreover favored by the curved or "cradle" configuration of the bottom oven, as permitted by the above disclosed modular construction. Actually, this configuration allows to properly control the thermal exchange amount given in a cross direction with respect to the oven driving direction, i.e. in the direction of the deflection to which the plastics material is subjected because of the heating operation.

Thus, the invention will provide an improved control of the plasticizing thermal process owing to a synergic combination of the following features, which derive from the main feature of the invention consisting of splitting each oven into two portions:

starting of the heating from two opposite sides of the sheet plastics material, which prevents any thermal differentials from occurring therebetween;

generating of two central regions with an increased heat release, said regions being arranged at each panel portions constituting the oven and, accordingly, at different points of the plastics material; and a thermal control, even in the direction of the cross deformation of the plastics material sheet, owing to the curved or bulged configuration of the bottom oven.

Accordingly, the invention improves the prior art apparatus in this field, owing to the above mentioned individual effects, as well as with respect to a combination thereof. Thus, a proper thermal process can be carried out in the heating station with a consequent drastic reduction of any overheating burning effects.

With respect to this latter aspect, the composite construction of the oven included in the apparatus according to the present inventions assumes a very important importance. In fact, the oven can be driven away from the plastics material just starting from the point where is maximum the probability of possible burning or flaming phenomena. In fact, as stated, that region of the plastics material most susceptible to contact the heating electric resistances of the bottom oven (which would cause flaming phenomena to occur) will be arranged at the central portion of the bottom oven, i.e. the region scarcely subjected to deflection effects on the other hand, the half panels constituting the bottom oven of the inventive station are opened and driven away from one another just starting from this central region, thereby uncovering it at the start of the oven withdrawing displacement. Thus, whereas in conventional prior apparatus the burning contact would also occur upon starting of the backward stroke or displacement of the oven (since the heating panel can be withdrawn exclusively from a single side), in the apparatus according to the present invention, this dangerous phenomenon can not occur since as the half-panel displacement is started, then the oven will be immediately opened, just starting from the most deflected region of the deformed plastics material (corresponding to that portion of said deformed plastics material closest to the hot oven heating resistances).

Thus, the herein claimed construction provides a great advantage even with respect to the structure of the individual thermal units of the heating ovens, since the wiring assemblies are much more simple than conventional wiring assembly, and the electric wires or cables will have a greatly reduced length (corresponding to the width of each panel portion, instead of the overall width of the oven).

Consequently, the splitting of the thermal power into independent parts, which parts are separated from the overall oven construction according to the invention, will allow to provide an improved thermal control, thereby the heating electrical resistances can be held closest to the plastics material to be processed, thereby greatly reducing the size of the overall system.

The flexibility of the apparatus according to the present invention is moreover a direct consequence of the specifically designed arrangement of the panel portions at the ends of the heating station, which will allow the operator to easily access the station from two different and opposite sides, to perform processing operations such as the loading and unloading of the plastics material to be processed, the replacement of the processing molds and of the thermoforming tools as well as the control of the apparatus controls.

BRIEF DESCRIPTION OF THE DRAWINGS

The above as well as further characteristics and advantages of the invention will become more apparent hereinafter from the following detailed disclosure of a preferred embodiment of the invention which is illustrated, by way of a not limitative example, in the figures of the accompanying drawings, where.

DESCRIPTION OF THE PREFERRED EMBODIMENT

The apparatus shown in the drawing figures is a thermoforming apparatus of the single-station type. This apparatus, which has been specifically designed for hot molding a sheet plastics material (for example thermoplastics materials such as polystyrene, ABS resins, PVC, PMMA), is of the type including two heating ovens which can be sandwich arranged respectively above and under the mentioned sheet material to be thermoformed or molded. In this connection it should be however pointed out that the invention is not limited to this embodiment, the scope thereof also encompassing heating stations including a single heating oven indifferently arranged either above or under the plastics material to be processed.

Figure 1:
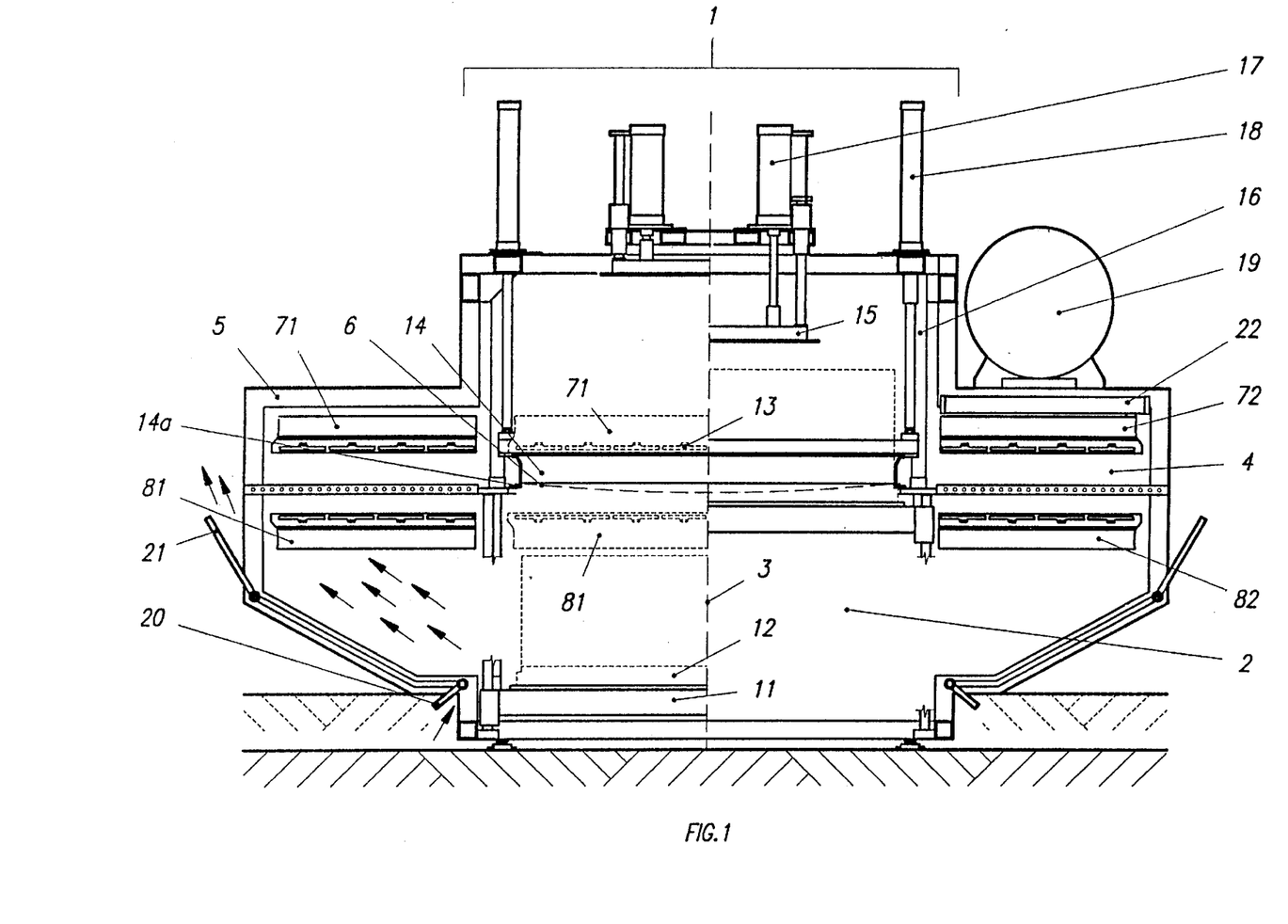
FIG. 1 is a longitudinal cross section view illustrating the apparatus according to the invention in two different steps of the operating process thereof.

The thermoforming apparatus according to the invention has been generally indicated by 1 in FIG. 1. Said apparatus comprises a bottom main casing 2, in which is provided a heating and forming station 3. At the end portions of the main casing 2 are moreover provided corresponding housing chambers or extensions 4 and 5 for housing therein the panel portions forming each heating oven, as they are arranged at a rest position.

Figure 4:
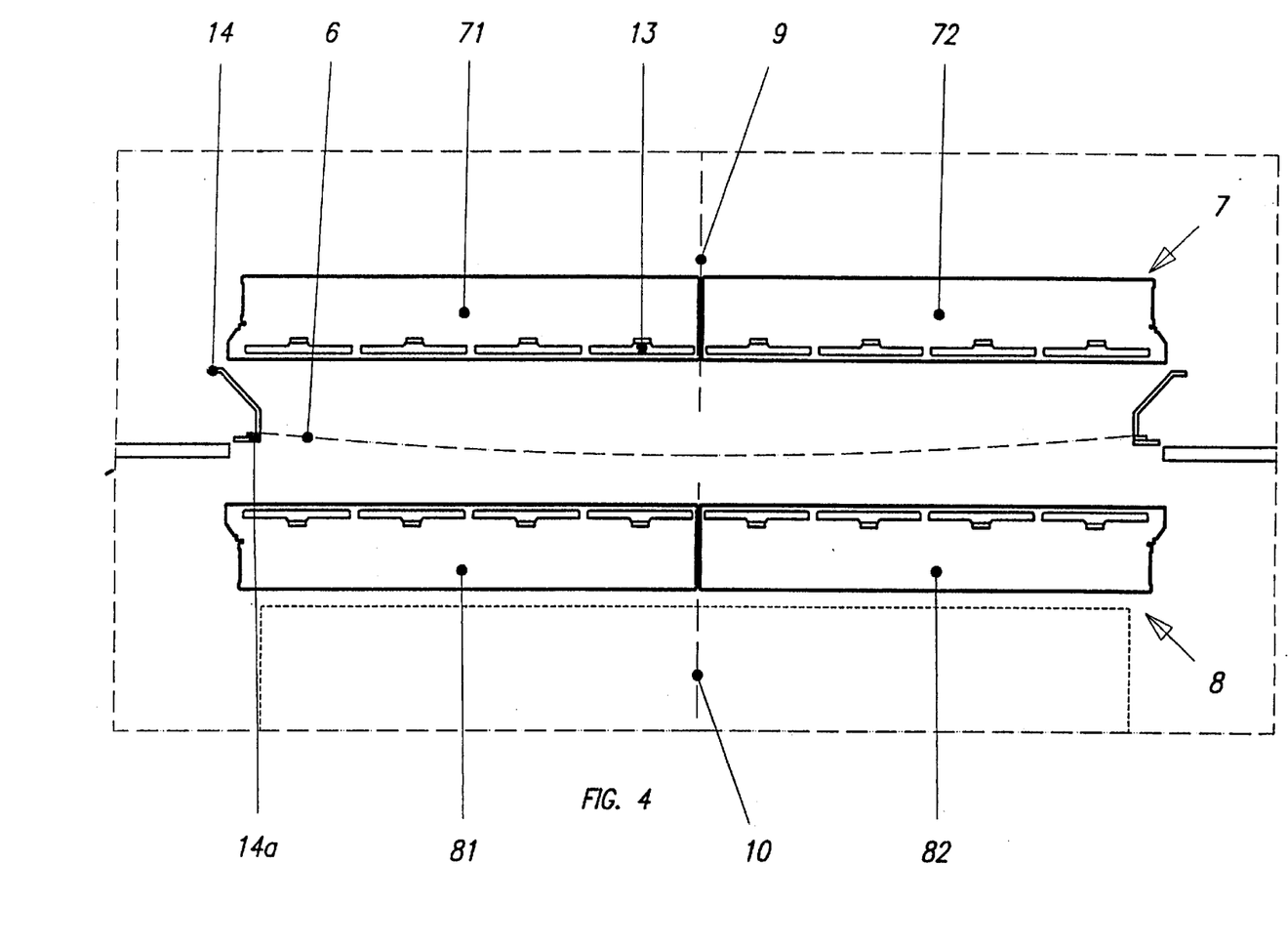
FIG. 4 illustrates a detail of the arrangement of the half-planes at a heating position for heating a plastics material sheet.

As clearly shown in FIG. 4, the apparatus according to the invention comprises two heating ovens 7 and 8 which are sandwich arranged respectively above and under the plastics material sheet 6. Each oven 7 and 8 is in turn constituted by two half-panels, respectively indicated by 71, 72 and 81, 82 which are coupled to one another, with a head-to-head relationship, at the height of corresponding middle or axial lines 9 and 10. Each half-panel is moreover provided with heating electric resistances 13 facing the plastics material sheet 6.

Said half-panels can operate between a rest position (shown by solid lines in FIG. 1) where they are housed in the housing chambers 4 and 5 of the main casing 2, with an arrangement 71, 81 and 72, 82 (see said FIG. 1) and an operating position, in which said half-panels are mutually adjoined to form the ovens 7 and 8 respectively arranged above and under the plastics material sheet 6 (FIG. 4).

The thermoforming apparatus 1 comprises moreover a bottom movable plate 11 for supporting the thermoforming mold 12, as well as clamping frames 14 and 14a for clamping the sheet material 6 along the perimetrical edge thereof.

At the top of said thermoforming machine 1 are moreover provided a counter-mold assembly 15 and a cylinder assembly including cylinders 16, 17 and 18 respectively for operating the mold bearing plate 11, the counter-mold assembly 15 and the clamping frames 14 and 14a. The apparatus 1 comprises furthermore a tank 19 for providing vacuum inside the main casing 2, the walls of the chambers 4 and 5 being provided with vent openings 20 and 21 providing a sort of chimney effect (FIG. 1).

The horizontal driving or displacement of the half panels forming the ovens 7 and 8, which are slidably supported on sliding guides 23, is obtained by respective pneumatic cylinders 22, thereby each panel can be independently driven.

Figure 5:
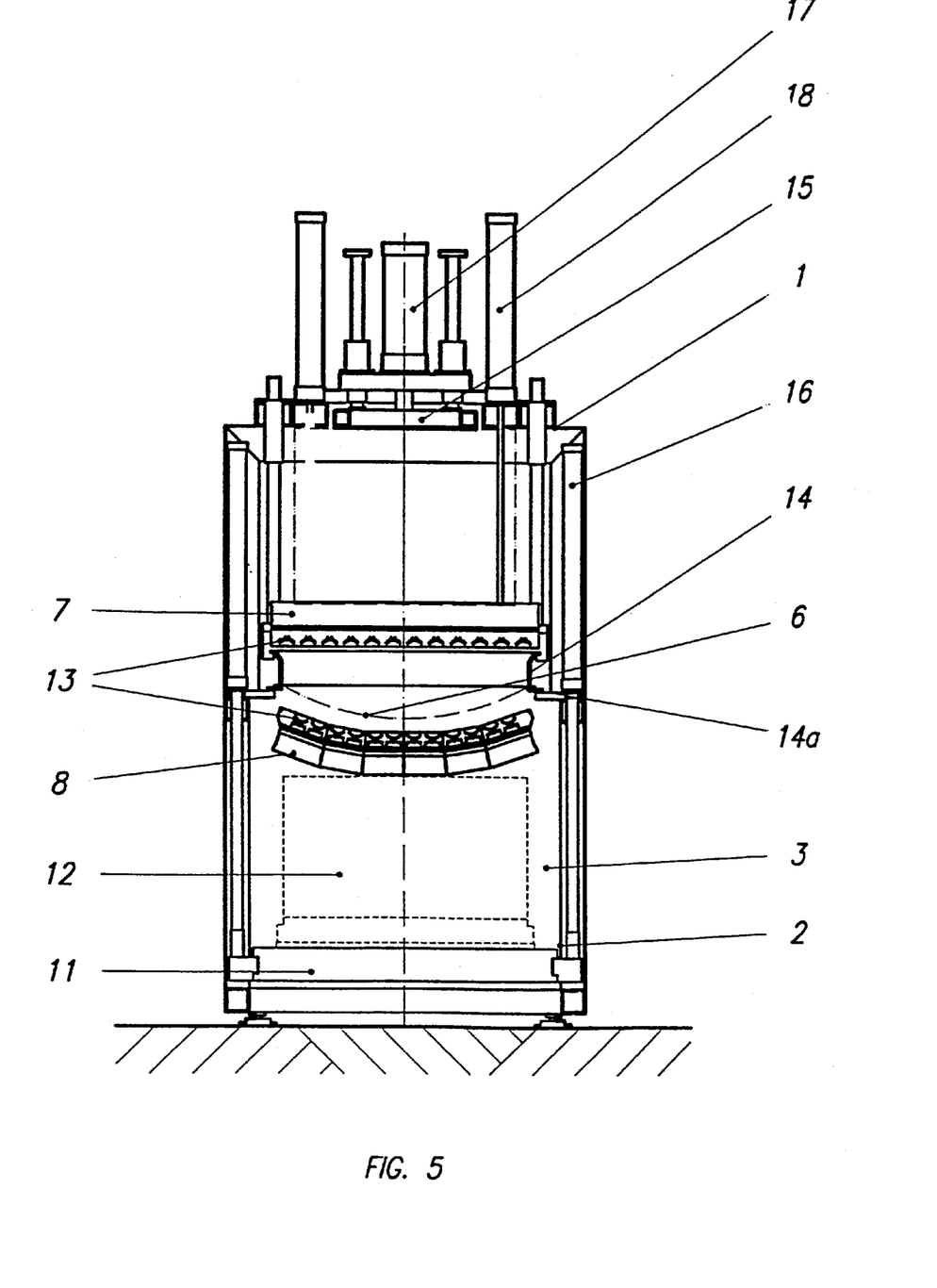
FIG. 5 illustrates a modified embodiment of the apparatus shown in FIG. 2, with a bottom oven having a cradle configuration.

In a modified embodiment shown in FIG. 5, the bottom oven 8 has a curved or cradle configuration, mating the profile of the "bulged portion" of the sheet 6 as the latter is deformed by heat.

The operation of the above disclosed thermoforming apparatus is as follows.

Figure 3:
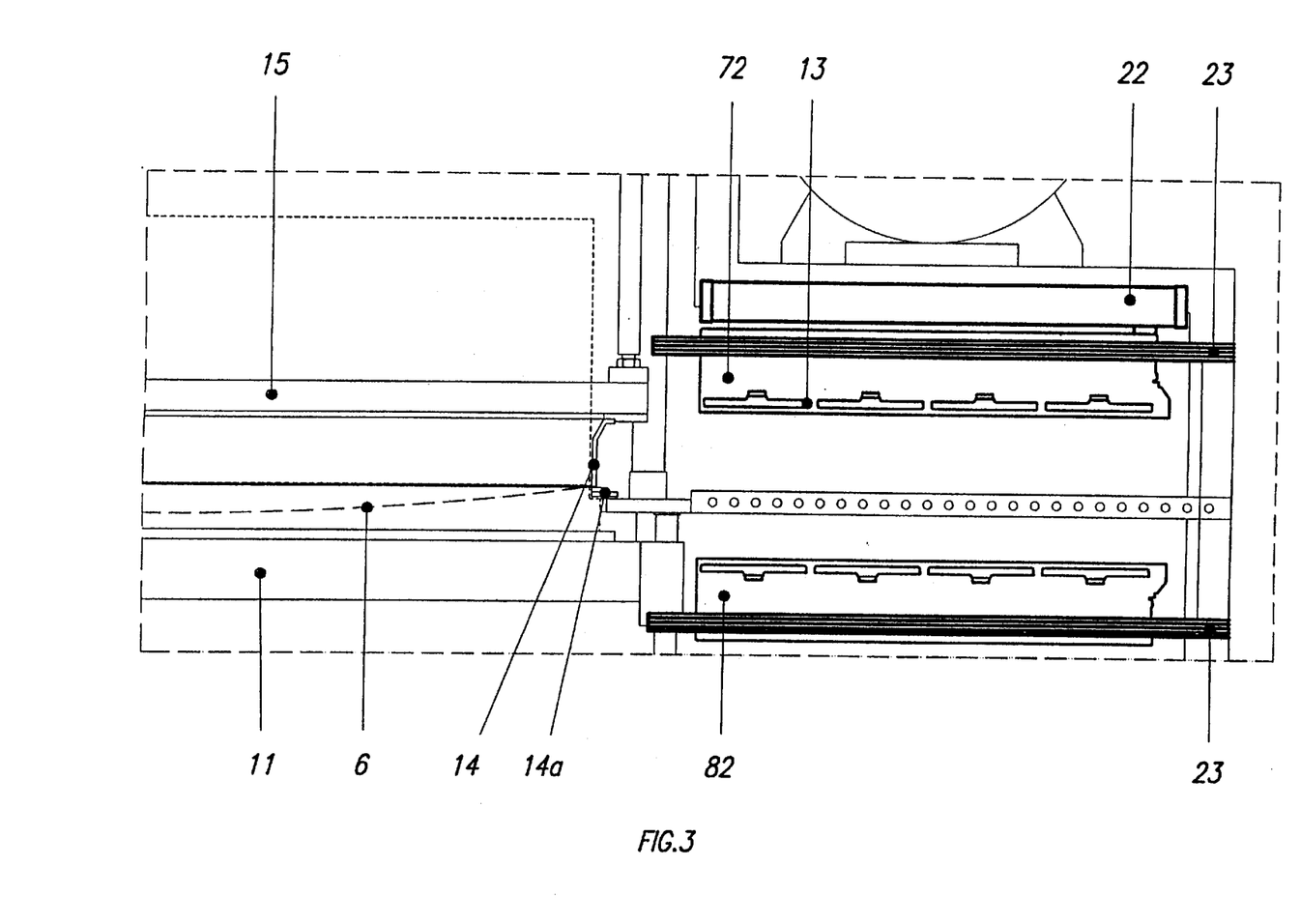
FIG. 3 illustrates a detail of the systems for supporting and driving the heating ovens of the apparatus shown in FIG. 1.

At the start, the operator 30 loads the plastics material sheet 6, by arranging it on the bottom frame 14a provided in the thermoforming station 3 and clamping it, by operating the cylinder 18, against the top frame 14a (FIG. 3). In particular, this loading operation can be performed either at the front side of the apparatus 1 (FIG. 6) or, indifferently, at the rear side thereof. During this loading step, the half-panels forming each heating oven 7 and 8 will be held in the chambers 4 and 5 arranged laterally of the main casing 2 and, more specifically: the half-panels 71, 81 being arranged inside the chamber 5; the half-panels 72, 82 being arranged inside the chamber 4 (which positions are shown by solid lines in FIG. 1).

Figure 2:
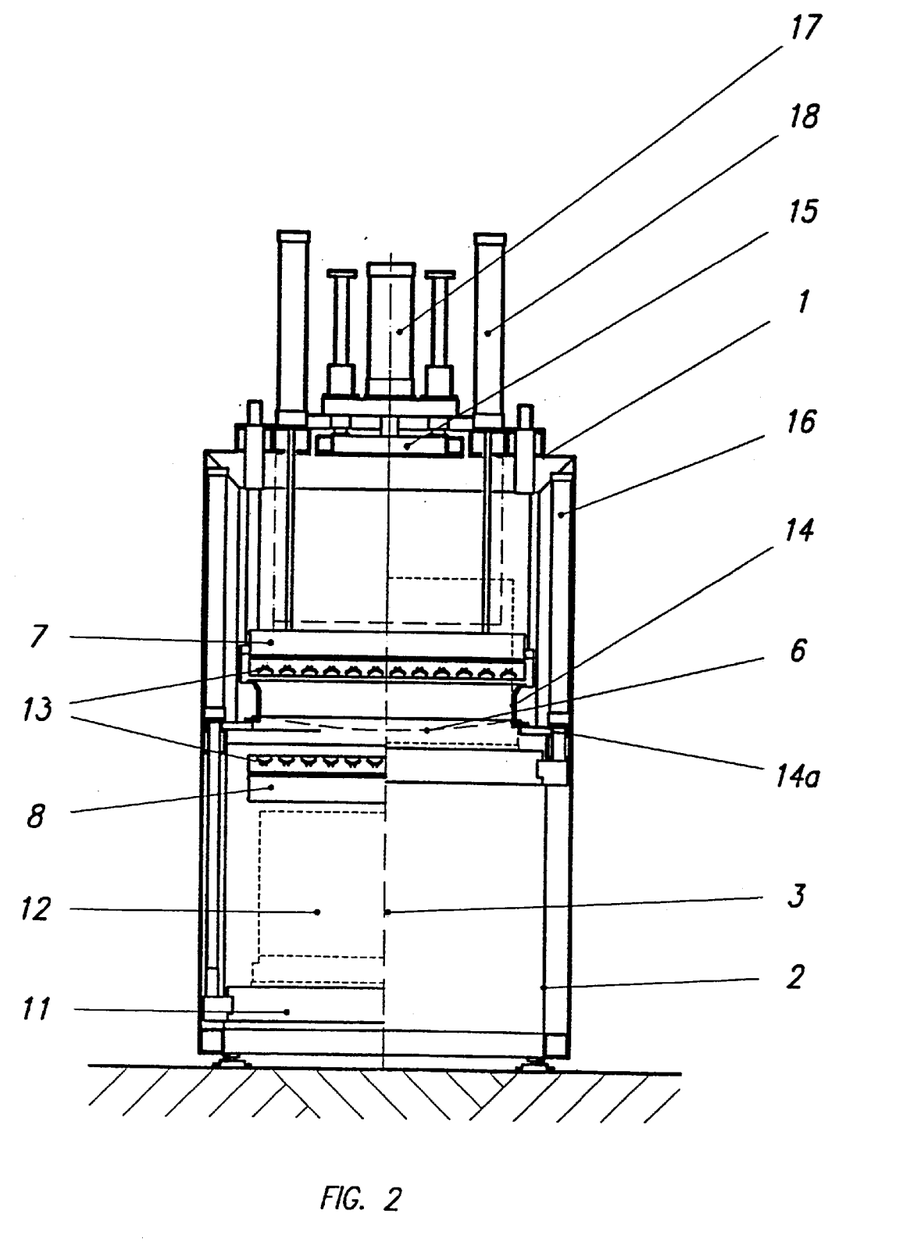
FIG. 2 is a cross sectional view illustrating the apparatus of FIG. 1, with the ovens thereof being in a working position.

Then, by actuating the driving and supporting means 22 and 23, each half-panel pair is driven toward the plastics material sheet 6, thereby forming, above and under said sheet, the heating ovens 7 and 8 (FIG. 2): the first oven, in particular, is formed by coupling in a head-to-head relationship the panels 71, 72 along the middle line 9 (FIGS. 4 and 7), the second oven being formed by likewise coupling the panels 81, 82 along the middle line 10 (FIG. 4).

Figure 6:
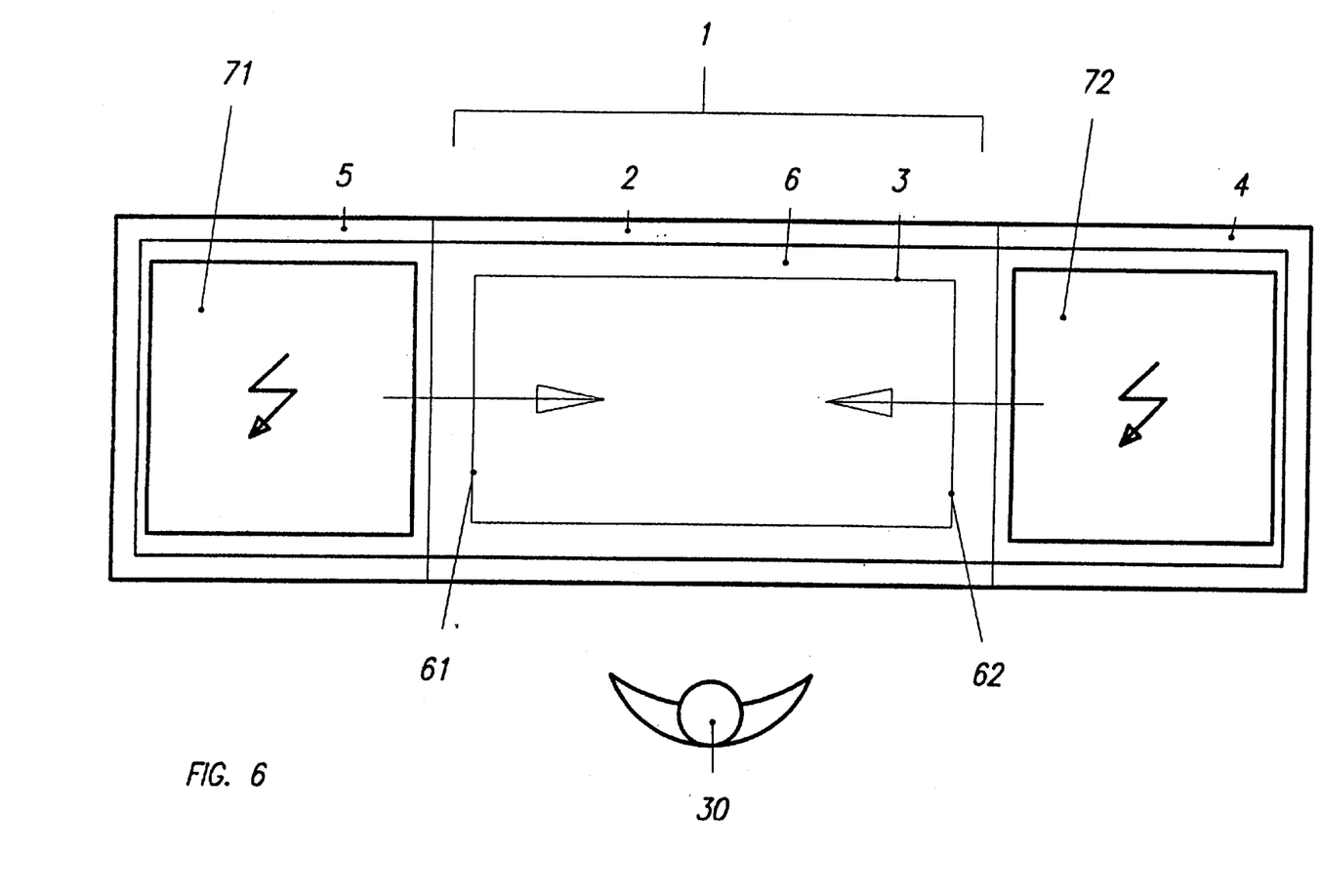
FIG. 6 is a top plan view illustrating the thermoforming apparatus according to the invention, the heating oven being shown in a rest condition.
Figure 7:
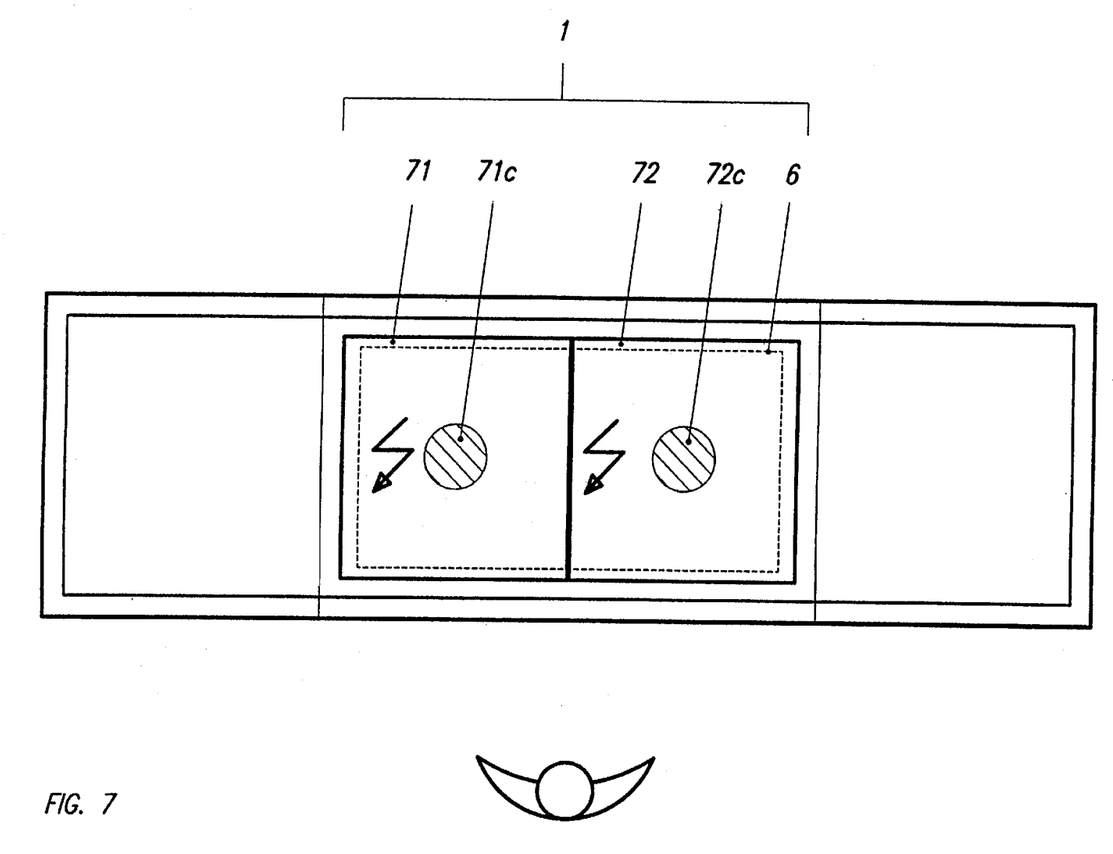
FIG. 7 illustrates the apparatus of FIG. 6, the heating oven being shown in a working condition.

As it should be apparent from comparing FIGS. 6 and 7, the half-panels are driven starting from the opposite sides 61 and 62 of the plastics material sheet 6, in the direction of the arrows shown in FIG. 6. Simultaneously with this displacement, the heating electric resistances 13 are energized, thereby providing regions of maximum heat releasing, arranged at the central area of each half-panel (71c and 72c in FIG. 7). The heating position shown in FIG. 7 will be held to achieve the desired or set plasticizing temperature of the plastics material sheet 6. As the plasticizing temperature has been achieved, the ovens will be opened by driving the oven half-panels in driving directions opposite to those shown in FIG. 6, starting from their mutual arrangement illustrated in FIG. 7. The excess heat supplied by the half-panel ovens arranged in the chambers 4 and 5, will be supplied by the ventilation generated, by the above mentioned chimney effect, between the openings 20 and 21 provided in said chambers. Then, by using the vacuum tank 19 of FIG. 1, the plastics material sheet will be subjected to a pre-stretching step, with a simultaneous closing of the mold 12–15. At the end of the molding operation, the operator will withdraw the formed sheet from the thermoforming apparatus and will replace it with a new sheet to be thermoformed.

In the embodiment shown in FIG. 5, as stated, the deflection of the sheet 6 is facilitated by the cradle or curved-concave configuration of the bottom oven 8. Even in this case, the displacements of the respective panel portions 81 and 82 correspond to the those which have been above disclosed with reference to FIGS. 6 and 7.

With respect to this modified embodiment of the invention, it should be pointed out that the withdrawal of the oven 8 from its working position shown in FIG. 5 is allowed by moving away from one another the half panels 81 and 82 which, as they are driven laterally and outside the edges 61 and 62 of the sheet 6 (FIG. 6), will not interfere against the deformed by plastics material sheet at the end of the plasticizing process.

From the above disclosure it should be apparent that the heating operation is carried out in a very even manner, due to the engagement of the half-panels with the two opposite sides of the sheet to be thermoformed (FIG. 6), to the distribution on at least two different points of the heat concentrating regions (FIG. 7) and, finally, due to a proper control of the temperature gradient, even in the deflection direction of the plasticized material (FIG. 5).

Owing to the above mentioned improved heat distribution, possible overheating burning of the plastics material sheet is greatly reduced. In this case, since the most probable contact point between the sheet 6 and underlaying oven 8 is that the vertical projection whereof coincides with the middle line 10 of the oven (FIG. 4), it should be apparent that, immediately as the two half-panels 81 and 82 are driven away, a void space is formed under the falling point of the plastics material. This, in combination with a corresponding opening of the top panel 7, will prevent any burnings from occurring.

While the thermoforming apparatus of the present invention has been disclosed and illustrated with reference to a preferred embodiment thereof, it should be apparent that the disclosed embodiment is susceptible to several modifications and variations all of which will come within the spirit and scope of the invention. Thus, for example, the heating panels could be provided with a different configuration and, moreover, it would be possible to provide different driving and supporting means therefor.

Moreover, the individual panel portions 71, 72 and 81, 82 can be made with a different size. In particular, the scope of the invention will also encompass heating or thermoforming stations provided with a single heating oven (arranged either above or under the plastics material to be thermoformed).

Furthermore, the thermoforming process can also be carried by using the single mold 12, the counter-mold effect being provided either by the vacuum in the tank 19, or by using pressurized air.

I claim:

1. A single-station thermoforming apparatus, comprising at least a movable oven drivable through a plane parallel to a laying plane of a plastics material sheet to be thermoformed and at least a mold, wherein said oven comprises a heating panel formed by two panel portions which are drivable through said parallel plane to said laying plane of said plastics material sheet and which are mutually couplable at a common coupling line.

2. An apparatus according to claim 1, wherein said panel portions comprise half-panels and said coupling line is a middle line of said movable oven.

3. An apparatus according to claims 1, wherein said apparatus comprises moreover driving means for driving and slidably supporting said two panel portions in a mutually independent manner.

4. An apparatus according to claim 1, wherein said apparatus comprises moreover a casing including side housing chambers for housing said panel portions at a rest position thereof.

5. An apparatus according to claim 4, wherein said side housing chambers are provided with ventilating openings for providing a chimney ventilating effect in said chambers.

6. An apparatus according to claim 1, wherein said apparatus is provided with two ovens, said ovens being respectively arranged above and under said plastics material sheet to be thermoformed.

7. An apparatus according to claim 6, wherein said two ovens are arrangable in a rest position thereof.

8. An apparatus according to claim 4, wherein said panel portions are removable from said side housing chambers for coupling to one another at said coupling line.

9. An apparatus according to claim 1, wherein said oven is formed by a panel arranged under said plastics material sheet, said panel including panel portions which are mutually closable with a head-to-head relationship thereby providing a curved oven mating a deflection assumed by said sheet as said sheet is brought to a plasticizing temperature thereof.

10. An apparatus according to claim 1, wherein said two panel portions are provided with electric resistances facing a side of said oven facing said sheet.

11. An apparatus according to claim 1, wherein each panel portion provides respective regions of increased thermal exchange on said sheet.

12. An apparatus according to claim 1, wherein said apparatus comprises moreover a bottom movable plate for supporting said mold, a counter-mold assembly and clamping frames for perimetrically clamping said sheet, driving means being moreover provided for respectively driving said plate, counter-mold and frames.

13. An apparatus according to claim 12, wherein said apparatus comprises moreover a vacuum tank.

* * * * *